(12) United States Patent
Singh et al.

(10) Patent No.: US 9,012,086 B2
(45) Date of Patent: Apr. 21, 2015

(54) ACTIVE MATERIAL FOR RECHARGEABLE MAGNESIUM ION BATTERY

(71) Applicant: Toyota Motor Engineering & Manufacturing North America, Inc., Erlanger, KY (US)

(72) Inventors: Nikhilendra Singh, Ypsilanti, MI (US); Masaki Matsui, Tsu (JP)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 40 days.

(21) Appl. No.: 13/785,054

(22) Filed: Mar. 5, 2013

(65) Prior Publication Data

US 2014/0255774 A1  Sep. 11, 2014

(51) Int. Cl.
*H01M 4/38* (2006.01)
*H01M 4/46* (2006.01)

(52) U.S. Cl.
CPC ............. *H01M 4/381* (2013.01); *H01M 4/466* (2013.01)

(58) Field of Classification Search
CPC .............................. H01M 4/381; H01M 4/466
USPC ............... 429/218.1, 188, 199, 200, 231.6
See application file for complete search history.

(56) References Cited

U.S. PATENT DOCUMENTS

| | | |
|---|---|---|
| 2,683,184 A | 7/1954 | Boswell |
| 2,934,583 A | 4/1960 | Stevens |
| 5,510,046 A | 4/1996 | Li et al. |
| 6,090,505 A * | 7/2000 | Shimamura et al. ........ 429/218.1 |
| 6,528,208 B1 * | 3/2003 | Thackeray et al. ......... 429/218.1 |
| 2005/0069776 A1 | 3/2005 | Holl et al. |
| 2006/0222955 A1 | 10/2006 | Ogawa et al. |
| 2009/0311608 A1 | 12/2009 | Hirose et al. |
| 2011/0039150 A1 * | 2/2011 | Wang et al. .................. 429/163 |

* cited by examiner

*Primary Examiner* — Nicholas P D'Aniello
(74) *Attorney, Agent, or Firm* — Gifford, Krass, Sprinkle, Anderson & Citkowski, P.C.

(57) ABSTRACT

A magnesium ion battery includes a first electrode including a substrate and an active material deposited on the substrate. Also provided is a second electrode. An electrolyte is located between the first electrode and the second electrode. The electrolyte includes a magnesium compound. The active material includes indium and an intermetallic compound of magnesium and indium.

13 Claims, 8 Drawing Sheets

Fig. 1

Fig. 2: XRD spectra of (1) sputtered In on Cu foil, (2) sputtered In on Pt coated Cu foil, and (3) magnesiated In on Cu foil.

Fig. 7 : SEM images of (a) sputtered In on Pt coated Cu foil, (b) sputtered In on Cu foil, and (c) magnesiated In on Cu foil.

Fig. 8 : EDX microanalysis mapping of a magnesiated In film. (a) Low magnification electron image, (b) mapping distribution of In in (a), and (c) mapping distribution of Mg in (a).

ACTIVE MATERIAL FOR RECHARGEABLE MAGNESIUM ION BATTERY

FIELD OF THE INVENTION

The invention relates to electrochemical devices such as batteries, in particular rechargeable batteries, such as a rechargeable magnesium ion battery.

BACKGROUND OF THE INVENTION

Rechargeable batteries, such as lithium ion batteries, have numerous commercial applications. Energy-density is an important characteristic, and higher energy-densities are desirable for a variety of applications.

A magnesium ion in a magnesium or magnesium ion battery carries two electrical charges, in contrast to the single charge of a lithium ion. Improved electrode materials would be very useful in order to develop high energy-density batteries.

SUMMARY OF THE INVENTION

In one aspect there is disclosed a magnesium ion battery that includes a first electrode including a substrate and an active material deposited on the substrate. Also provided is a second electrode. An electrolyte is located between the first electrode and the second electrode. The electrolyte includes a magnesium compound. The active material includes indium and an intermetallic compound of magnesium and indium.

In another aspect, there is disclosed a negative electrode for a magnesium ion battery that includes a substrate and active material deposited on the substrate. The active material includes indium and an intermetallic compound of magnesium and indium.

DETAILED DESCRIPTION OF THE INVENTION

Examples of the present invention include electrochemical devices, such as batteries, in particular rechargeable batteries. Examples include magnesium-based batteries, and specifically to materials used as active materials within the electrodes of a magnesium battery. In particular, an example battery includes an electrode active material that includes indium. For example, the active material may include indium and an intermetallic compound of indium and magnesium. The improved active materials described herein may be used within the anode of an example battery.

In one aspect, an improved active material may include a compound of the formula $Mg_xIn_{1-x}$ (0<x<1). In a specific example, which is not intended to be limiting, an improved active material for a magnesium battery includes indium and an intermetallic compound of indium and magnesium having the formula $Mg_3In_2$.

A rechargeable magnesium battery is expected to be a high energy battery system, because of its high energy-density. In particular, as compared to lithium-ion batteries, the magnesium ion transfers two electrons per magnesium ion. However, previously there have been no good cathode or anode active materials which can fully utilize the advantage of the high energy-density provided by the use of high voltage conventional battery electrolytes. Such conventional battery electrolytes cannot be used with magnesium metal anodes as they are incompatible with the metal. However, the conventional battery electrolytes can be used if the magnesium metal anode is replaced with an insertion-type anode like indium.

In examples of the present invention, improved active materials including indium and an intermetallic compound of indium and magnesium are used as the active material for a rechargeable magnesium ion battery. A particular example of an improved active material includes $Mg_3In_2$. The active material may further include an electrically conductive material or substrate and a binder. Examples of electrically conducting materials include carbon particles, such as carbon black. Example binders include various polymers, such as PVdF, PTFE, SBR, or Polyimide. Additionally, the active material may include a substrate such as copper or a platinum coated copper material such as a foil or sheet.

The electrolyte layer may include a separator which helps maintain electrical isolation between the positive and negative electrodes. A separator may include fibers, particles, web, porous sheet, or other form of material configured to reduce the risk of physical contact and/or short circuit between the electrodes. The separator may be a unitary element, or may include a plurality of discrete spacer elements such as particles or fibers. The electrolyte layer may include a separator infused with an electrolyte solution. In some examples, for example using a polymer electrolyte, the separator may be omitted.

The electrolyte layer may include a non-aqueous solvent, such as an organic solvent, and a salt of the active ion, for example a magnesium salt. Magnesium ions provided by the magnesium salt interact electrolytically with the active material(s). An electrolyte may be an electrolyte including or otherwise providing magnesium ions, such as a non-aqueous or aprotic electrolyte including a magnesium salt. The electrolyte may include an organic solvent. Magnesium ions may be present as a salt or complex of magnesium, or as any appropriate form.

An electrolyte may include other compounds, for example additives to enhance ionic conductivity, and may in some examples include acidic or basic compounds as additives. An electrolyte may be a liquid, gel, or solid. An electrolyte may be a polymer electrolyte, for example including a plasticized polymer, and may have a polymer infused with or otherwise including magnesium ions. In some examples, an electrolyte may include a molten salt.

In the example of a battery including an electrode having a cathode active material it may be present as a sheet, ribbon, particles, or other physical form. Cathode active materials may include materials that show an electrochemical reaction at a higher electrode potential than the first electrode or anode. An example of one cathode active material is a transition metal oxide or sulfide. In another aspect, the cathode may include an active material of α $MnO_2$ An electrode containing the cathode active material may be supported by a current collector.

Figure 1:
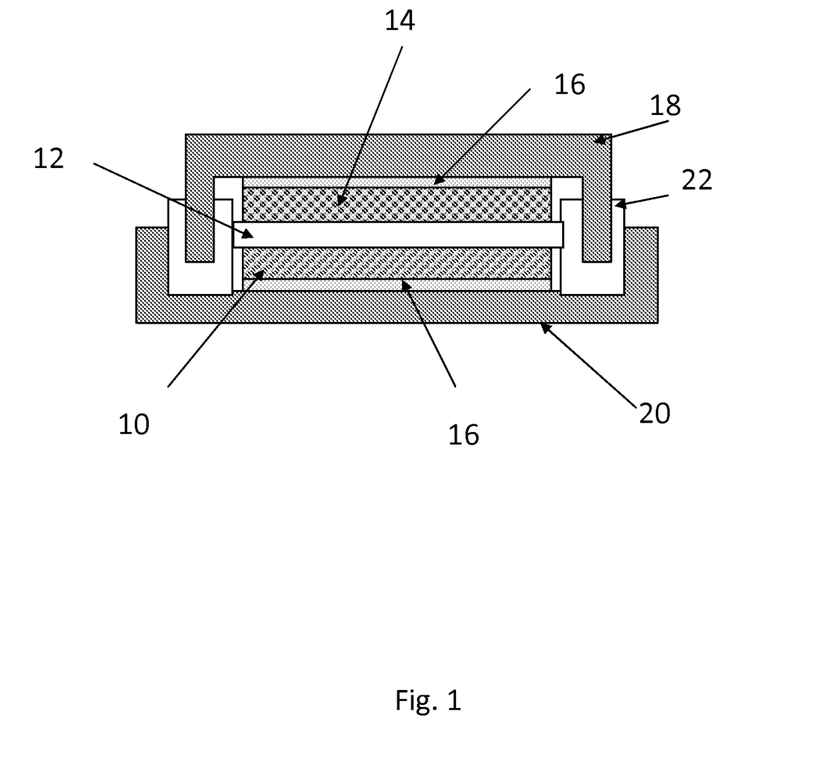
FIG. 1 is a diagram of a magnesium or magnesium ion battery having a positive electrode containing a cathode active material and a negative electrode including a novel active material.

FIG. 1 shows a rechargeable magnesium ion battery having an improved negative electrode active material. The battery includes a positive electrode 10 including a cathode active material, an electrolyte layer 12, a negative electrode 14, current collector or substrate 16, negative electrode housing 18, positive electrode housing 20, and sealing gasket 22. The electrolyte layer 12 includes a separator soaked in electrolyte solution, and the positive electrode 10 is supported by a current collector 16. In this example, the negative electrode includes an improved active material according to an example of the present invention and a substrate. For example, the negative electrode may include indium and/or an intermetallic compound of magnesium such as $Mg_3In_2$.

A current collector may include a metal or other electrically conducting sheet on which the electrode is supported. A metal sheet may include aluminum, copper, or other metal or alloy. In some examples, a metal housing may provide the function of a current collector. Other conducting materials, such as electrically conducting polymers, may be used as the current collector.

The indium may be electrodeposited on the current collector. Electrodeposition of the indium deposits the anode directly on the surface of the current collector. Electrodeposition is advantageous in that it eliminates the need for binders and electronic conductors and thereby decreases the overall weight of the anode material. In one aspect, films having a thickness in the nanoscale range may be deposited uniformly on the current collector in a thin film. The size of the indium particles electrodeposited on the current collector may range from about 2 nm to about 500 nm. In this manner magnesium ions may be easily inserted and removed from the indium material.

In one aspect, the magnesium ion battery and an electrode having indium as an active material may have a capacity of greater than 300 mAh/g. As seen in the figures and as shown in the following examples, In anodes are capable of $Mg^{2+}$ insertion/extraction processes while displaying high capacities and low $Mg^{2+}$ insertion/extraction potentials.

EXAMPLES

Indium (In) films were sputter deposited on to copper (Cu) foil and platinum (Pt) coated Cu foil substrates, in an Orion 5 series sputter coater (AJA International Inc.) modified with a glove box attachment for air free sample transfer. The Cu foil used in both cases was 0.1 mm thick and purchased from Alfa Aesar. Substrates were introduced into the sputtering chamber, directly from a connected glove box to avoid any exposure to air or moisture. Sputter deposition on to both substrates was carried out at room temperature and a constant substrate rotation speed of 80 RPM to maintain homogeneity, under the following conditions: Applied target power (In): 30 W; Sputtered film thickness: 200 nm; Substrate height: 17 mm; Atmosphere: 3 mtorr argon.

Sputtered films were transported directly from the sputter coater back into the glove box via the air free sample transfer system where the In samples were stored for analytical and electrochemical analysis.

Characterization of Sputtered In Films:

The sputtered In films were characterized via X-ray diffraction (XRD), field emission scanning electron microscopy (FESEM) and energy dispersive X-ray spectroscopy (EDX) to determine the crystallinity, morphology and the presence of a magnesiated phase upon the insertion of $Mg^{2+}$ into In, respectively. FESEM and EDX studies were carried out on a FEI NOVA Nano-FESEM operated at 5-20 kV, with a spot size of 3-5 and a working distance of 4-5 mm. XRD measurements were carried out on a Rigaku Smartlab X-ray diffractometer by scanning at 1 deg/minute between 10 and 60 degrees 2-theta. All samples tested for the presence of a magnesiated phase were rinsed in THF prior to removal from the glove box, to dissolve any excess electrolyte left behind during the dissassembly of the Tomcells.

Electrochemical Evaluation of Sputtered In Films

Electrochemical cycling properties of each In anode was carried out using a conventional Tomcell at C/50 rates. Each Tomcell was assembled within a glove box to avoid the exposure of the In anode or the electrolyte to air or moisture. Galvanostatic charge/discharge experiments were done on a Biologic VMP3 potentiostat, in 0.25 M of 2:1 ethyl magnesium chloride (EtMgCl): diethyl aluminum chloride ($Et_2AlCl$) electrolyte at room temperature.

Figure 2:
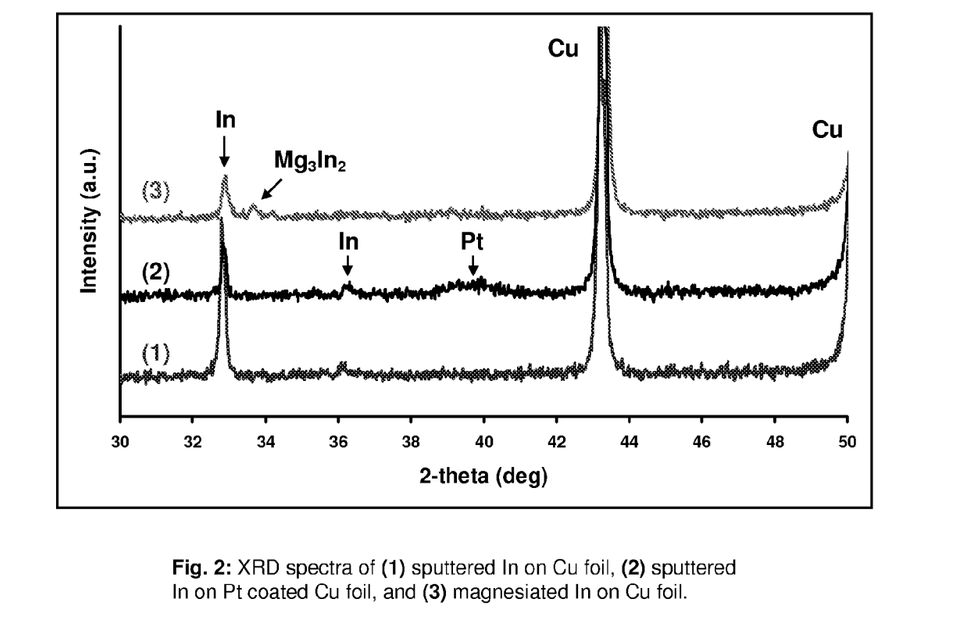
FIG. 2 is a plot of XRD spectra for 1) In deposited on copper 2) In deposited on platinum coated copper and 3) magnesiated In on copper.

Referring to FIG. 2, In and magnesiated films of In were characterized via XRD to determine crystallinity, preferred orientation and the presence of any impurity phases. As seen in FIG. 2, the XRD spectra for the as-deposited In films on both Cu and Pt coated Cu substrates show a preferred (101) orientation (2-theta=32.8 deg.) along with the absence of any impurity phases (oxides and alloys). Further, upon magnesiation, crystalline peaks associated with the formation of magnesiated indium ($Mg_3In_2$) are observed along with a lowering in the crystallinity of the In peaks demonstarting the insertion of $Mg^{2+}$ ions into the Indium material.

Additionally, the In films were subjected to FESEM analysis The In films were imaged to determine the surface morphology and particle size of In on each electrode and the magnesiated In film was imaged to study alterations in the morphology due to the insertion of $Mg^{2+}$ into the In film, during the magnesiation process.

Figure 7:
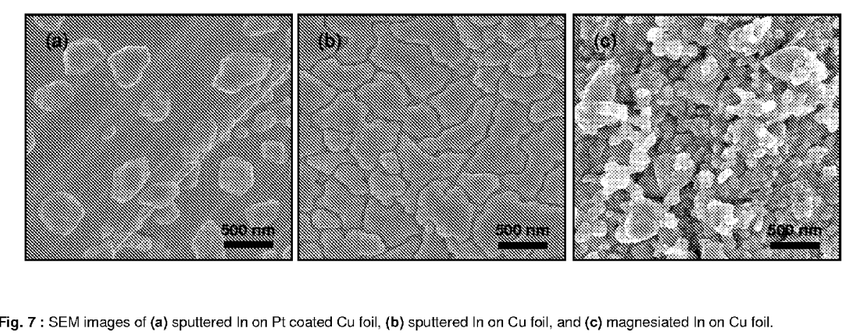
FIG. 7 shows SEM images of (a) sputtered In on Pt coated Cu foil, (b) sputtered In on Cu foil, and (c) magnesiated In on Cu foil.

Referring to FIG. 7, there is shown the SEM images of the as-deposited In film on Pt coated Cu foil, Cu foil and a magnesiated In film on Cu foil. As can be seen in the Figure nano sized In particles were observed.

Figure 8:
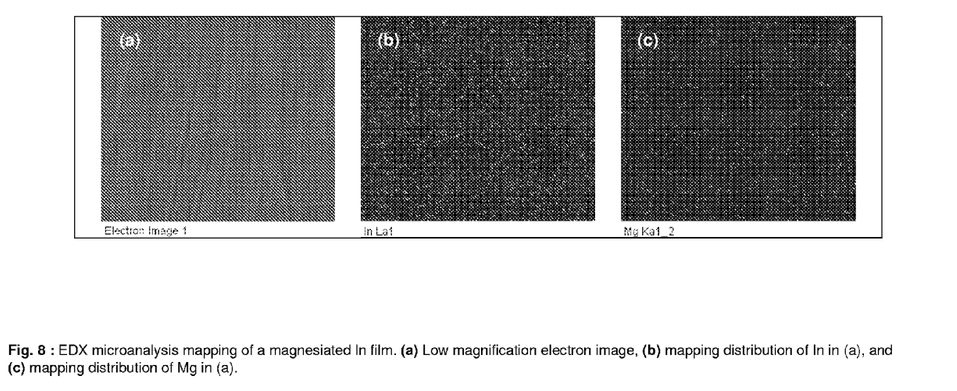
FIG. 8 shows EDX mapping of a magnesiated In film. (a) Low magnification electron image, (b) mapping distribution of In in (a), and (c) mapping distribution of Mg in (a).

EDX microanalysis was carried out on the magnesiated In films to determine approximate elemental compositions. Table 1 shows the elemental composition of a magnesiated In film in the area depicted in electron image 1 of FIG. 8a. FIGS. 8b and 8c show elemental mapping for In and Mg for electron image 1 (low magnification image), respectively. The Mg mapping shows a very homogeneous distribution of Mg across the In anode.

TABLE 1

| EDX microanalysis results for a magnesiated In film. | | |
|---|---|---|
| Element | Weight % | Atomic % |
| O (K) | 9.99 | 29.46 |
| Mg (K) | 6.66 | 12.92 |

TABLE 1-continued

EDX microanalysis results for a magnesiated In film.

| Element | Weight % | Atomic % |
|---------|----------|----------|
| Cu (K)  | 70.52    | 52.35    |
| In (L)  | 12.84    | 5.27     |
| Totals  | 100.00   |          |

Electrochemical Analysis of In Films

Figure 3:
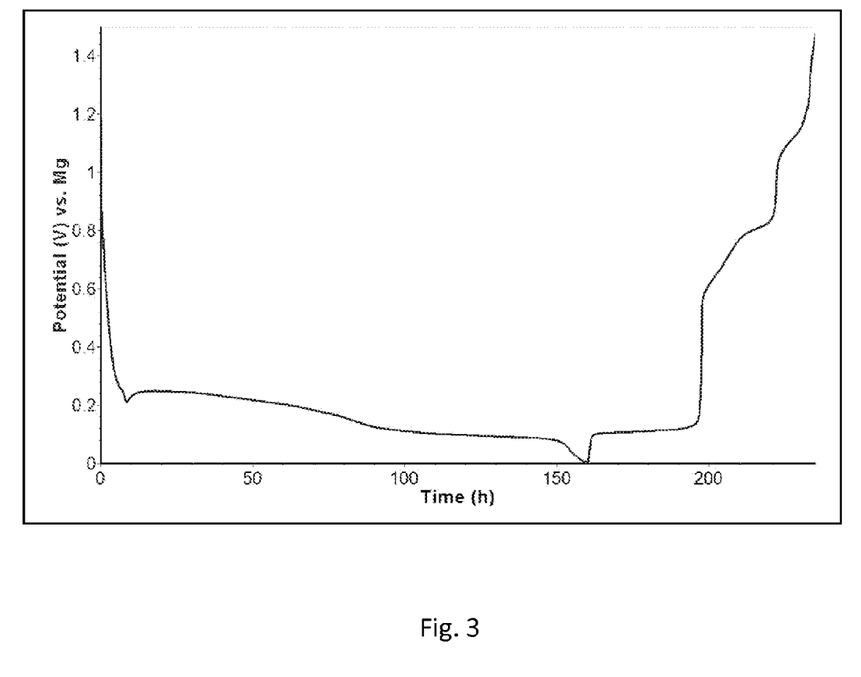
FIG. 3 is a diagram of magnesiation/de-magnesiation for In/Mg on copper at C/50 rate in 0.25 M of 2:1 EtMgCl:Et$_2$AlCl at room temperature in a Tomcell, between 0.0 V and +1.5 V.
Figure 4:
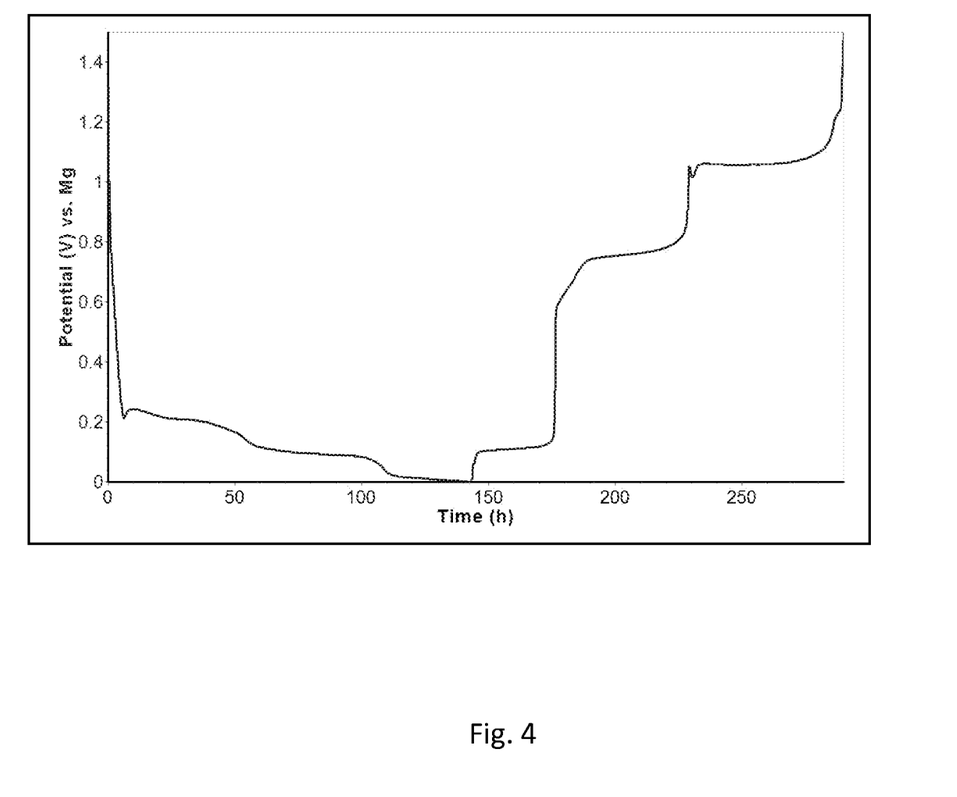
FIG. 4 is a diagram of magnesiation/de-magnesiation for In/Mg on platinum coated copper at C/50 rate in 0.25 M of 2:1 EtMgCl:Et$_2$AlCl at room temperature in a Tomcell, between 0.0 V and +1.5 V.
Figure 5:
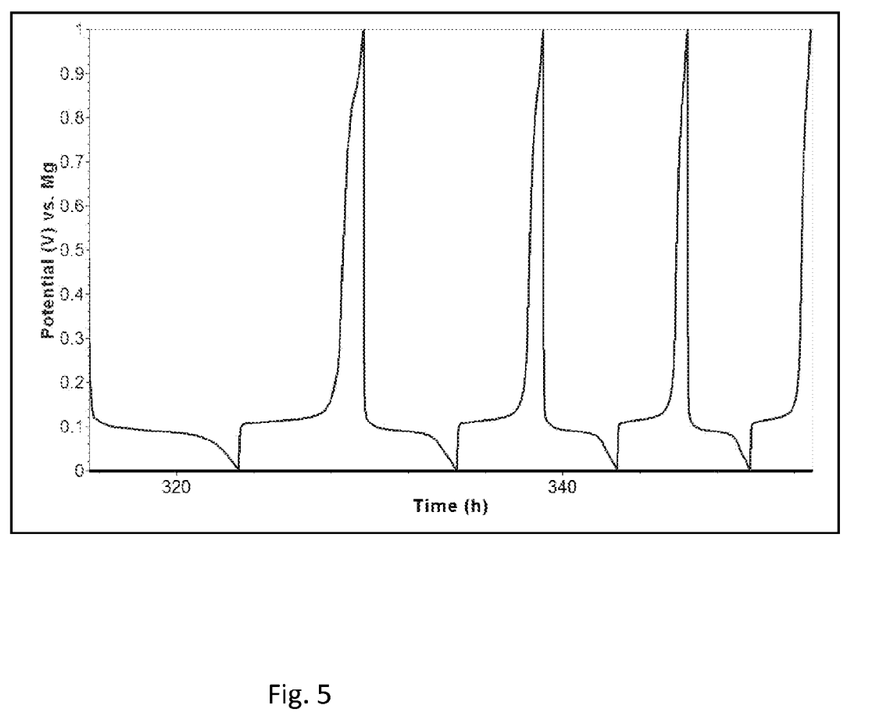
FIG. 5 is a diagram of magnesiation/de-magnesiation for In/Mg on copper at C/50 rate in 0.25 M of 2:1 EtMgCl:Et$_2$AlCl at room temperature in a Tomcell for four cycles following an initial cycle, between 0.0 V and +1.0 V.
Figure 6:
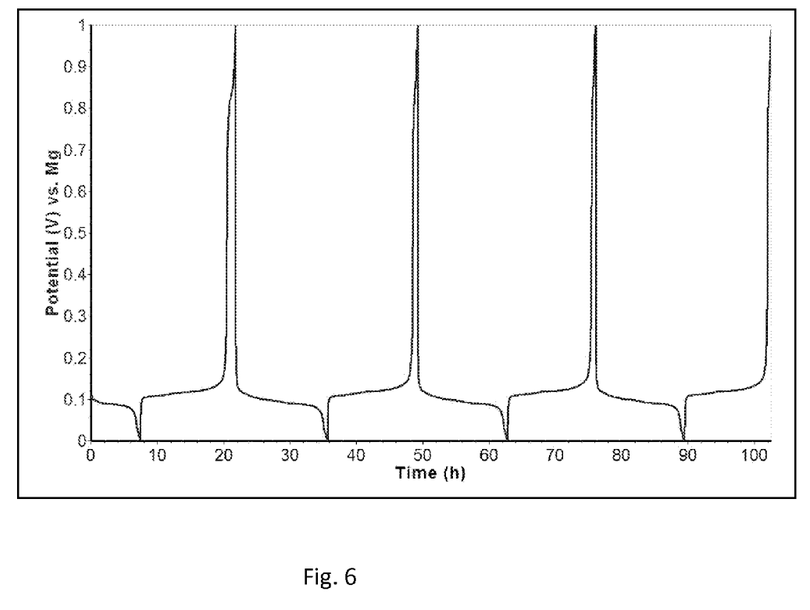
FIG. 6 is a diagram of magnesiation/de-magnesiation for In/Mg on platinum coated copper at C/50 rate in 0.25 M of 2:1 EtMgCl:Et$_2$AlCl at room temperature in a Tomcell for four cycles following an initial cycle, between 0.0 V and +1.0 V.

In films were cycled (magnesiated/de-magnesiated) under galvaniostatic conditions at a C/50 rate in 0.25 M of 2:1 EtMgCl:Et$_2$AlCl at room temperature in a Tomcell, between 0.0 V and +1.5 V. Cycling was carried out to observe the Mg$^{2+}$ insertion/extraction potentials of In against Mg metal in a half-cell configuration. FIGS. 3 and 4 show the data gathered for the first full magnesiation/de-magnesiation cycle of In films on Cu foil and Pt coated Cu foil substrates, respectively. As seen in FIG. 3, a plateau related to the insertion of Mg$^{2+}$ into In is observed at +0.09 V and an extraction plateau is observed at +0.12 V Referring to FIGS. 5 and 6, In films deposited on both substrates were cycled for an additional 4 cycles after the initial cycle. These additional cycles were carried out in the same Tomcell between 0.0 V and +1.0 V. As can be seen, the Mg$^{2+}$ insertion and extraction potentials remain the same on both substrates through all cycles.

The invention is not restricted to the illustrative examples described above. Examples described are not intended to limit the scope of the invention. Changes therein, other combinations of elements, and other uses will occur to those skilled in the art. The scope of the invention is defined by the scope of the claims.

Having described our invention, we claim:

1. A magnesium ion secondary battery comprising:
   a first electrode including a substrate and active material disposed on the substrates;
   a second electrode;
   an electrolyte disposed between the first electrode and the second electrode, the electrolyte including a magnesium compound,
   the active material including Indium and an intermetallic compound of the formula Mg$_x$In$_{1-x}$ where (0<x<1) and wherein the active material allows insertion and extraction of magnesium ions during cycling of the magnesium ion battery.

2. The magnesium ion secondary battery of claim 1, wherein the first electrode is a negative electrode, and the second electrode is a positive electrode.

3. The magnesium ion secondary battery of claim 2, wherein the second electrode includes a cathode active material which shows electrochemical reaction at higher electrode potential than the first electrode.

4. The magnesium ion secondary battery of claim 1 wherein the substrate is selected from carbon, copper foil and platinum coated copper foil.

5. The magnesium ion secondary battery of claim 1 wherein the active material includes In and/or Mg$_3$In$_2$.

6. The magnesium ion secondary battery of claim 1 wherein the cathode includes a MnO$_2$.

7. The magnesium ion secondary battery of claim 1 wherein the active material has a grain size of from 2 to 500 nanometers.

8. The magnesium ion secondary battery of claim 1 wherein the battery includes a capacity of greater than 300 mAh/g.

9. The magnesium ion secondary battery of claim 1 wherein the Mg$^{2+}$ insertion/extraction voltages are +(0.09/0.12 V).

10. The magnesium ion secondary battery of claim 1 wherein the active material has a phase corresponding to indium metal in a charged state of the active material and wherein the active material has a phase corresponding to an intermetallic compound of magnesium and indium in a discharged state of the active material.

11. The magnesium ion secondary battery of claim 1, wherein the electrolyte is selected from organohaloaluminate and conventional electrolytes.

12. The magnesium ion secondary battery of claim 11 wherein the conventional electrolytes are selected from magnesium bis(trifluoromethanesulfonyl)imide (TFSI) in 1,2-Dimethoxyethane (DME), magnesium ClO$_4^-$ and, magnesium PF$_6^-$.

13. The magnesium ion secondary battery of claim 11 wherein the organohaloaluminate is ethyl magnesium chloride : diethyl aluminum chloride (EtMgCl:Et$_2$AlCl).

* * * * *